(12) United States Patent
Karn

(10) Patent No.: US 8,641,497 B2
(45) Date of Patent: Feb. 4, 2014

(54) SYSTEM FOR TRACKING ACCOUNT ACTIVITY ON AN AMUSEMENT DEVICE

(75) Inventor: Jeffrey D. Karn, Warrington, PA (US)

(73) Assignee: AMI Entertainment Network, Inc., Bristol, PA (US)

( * ) Notice: Subject to any disclaimer, the term of this patent is extended or adjusted under 35 U.S.C. 154(b) by 0 days.

(21) Appl. No.: 13/567,569

(22) Filed: Aug. 6, 2012

(65) Prior Publication Data

US 2013/0035144 A1   Feb. 7, 2013

Related U.S. Application Data

(60) Provisional application No. 61/515,171, filed on Aug. 4, 2011.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .......... 463/9; 463/1; 463/16; 463/20; 463/25; 463/30; 463/40; 463/42

(58) Field of Classification Search
USPC ...................... 463/1, 9, 16, 20, 25, 30, 40, 42
See application file for complete search history.

(56) References Cited

U.S. PATENT DOCUMENTS

| | | | |
|---|---|---|---|
| 4,856,787 A | 8/1989 | Itkis | |
| 5,575,717 A | 11/1996 | Houriet, Jr. et al. | |
| 5,743,799 A | 4/1998 | Houriet, Jr. et al. | |
| 6,488,508 B2 | 12/2002 | Okamoto | |
| 6,582,310 B1 * | 6/2003 | Walker et al. | 463/42 |
| 6,612,931 B2 | 9/2003 | Kojima et al. | |
| 2002/0119824 A1 * | 8/2002 | Allen | 463/42 |
| 2004/0002382 A1 | 1/2004 | Ho et al. | |
| 2004/0053682 A1 * | 3/2004 | Nelson et al. | 463/25 |
| 2004/0268381 A1 * | 12/2004 | Simelius et al. | 725/19 |
| 2007/0066400 A1 * | 3/2007 | Kogo | 463/42 |
| 2008/0268953 A1 | 10/2008 | Acres | |
| 2010/0293453 A1 | 11/2010 | Schwarz | |

* cited by examiner

*Primary Examiner* — Adetokunbo O Torimiro
(74) *Attorney, Agent, or Firm* — Panitch Schwarze Belisario & Nadel LLP

(57) ABSTRACT

An amusement device system includes a first amusement device, a second amusement device and a central server. The first controller is coupled to the first memory and the first display. The first memory stores an electronic game having a plurality of game content. The first controller is configured to show a first game content of the plurality of game content to an authenticated user. The second controller is coupled to the second memory. The second memory stores the electronic game having the plurality of game content. The central server is configured to store information sufficient to identify the first game content displayed to the authenticated user. The first and second controllers are prevented by the central server from again showing the first game content until a remainder of the plurality of game content has been displayed to the authenticated user.

17 Claims, 6 Drawing Sheets

SYSTEM FOR TRACKING ACCOUNT ACTIVITY ON AN AMUSEMENT DEVICE

CROSS-REFERENCE TO RELATED APPLICATIONS

This application claims the benefit of U.S. Provisional Patent Application No. 61/515,171, filed on Aug. 4, 2011, entitled "System for Tracking Account Activity on an Amusement Device," the entire contents of which are incorporated herein by reference in its entirety.

BACKGROUND OF THE INVENTION

Amusement devices having electronic games for computers and touchscreens or other types of amusement devices are generally known. Amusement devices, such as game machines, which allow a user to select games from a video display are also known, such as those disclosed in U.S. Pat. Nos. 4,856,787 ("Itkis"); 5,575,717 ("Houriet, Jr., et al."); 5,743,799 ("Houriet, Jr., et al.") each of which is incorporated by reference and shows a touchscreen for making a game selection from a menu of games. Such game machines or amusement devices typically operate upon input of currency (i.e., coin, token, paper money, credit/debit cards or the like) and are typically installed in locations such as bars, restaurants, airports, shopping malls, video arcades, casinos or the like. The game choices may include card games, sports games, games of skill, games of chance, action games, trivia games, or the like.

Typically, each game includes a finite amount of game content, particularly a finite number of game scenarios or questions which are available for playing by an amusement device user or player. The finite game content of several games is loaded onto the individual amusement device and each individual amusement device, therefore, has a finite amount of game content that may be shown or displayed to a user. It is common for amusement device users to repeatedly see the same game scenario or question after playing a game only a few times. This can lead to amusement device users becoming bored with the available game choices and/or the sequence of game scenarios that are shown.

Thus, it is desirable to provide an amusement device system which ensures that an amusement device user is shown new game content every time he or she selects a game for play, until all available game content has been exhausted.

BRIEF SUMMARY OF THE INVENTION

Briefly stated, a preferred embodiment of the present invention is directed to an amusement device system including a first amusement device, a second amusement device and an internet-based central server. The first amusement device has a first memory, a first display and a first controller. The first controller is operatively coupled to the first memory, a first input device and the first display. The first memory stores an electronic game having a plurality of game content. The first controller controls the first display based at least in part on inputs from the first input device. The first controller is configured to show a first game content of the plurality of game content to an authenticated user on the first display. The second amusement device has a second memory, a second display and a second controller. The second controller is operatively coupled to the second memory, a second input device and the second display. The second memory stores the electronic game having the plurality of game content. The internet-based central server is in communication with the first and second amusement devices through the internet. The central server is configured to store information sufficient to identify the first game content displayed to the authenticated user. The first and second controllers are prevented by the central server from again showing the first game content to the authenticated user on the first and second displays until a remainder of the plurality of game content has been displayed to the authenticated user.

Another preferred embodiment of the present invention is directed to an amusement device system for tracking game content displayed to a first authenticated user. The amusement device system includes a first amusement device, a second amusement device and a central server. The first amusement device includes a first touchscreen video display and a first memory. The first memory stores a plurality of game content. The second amusement device includes a second touchscreen video display and a second memory. The second memory stores the plurality of game content. The central server is in communication with the first and second amusement devices. The central server is configured to receive first game content from the first amusement device that defines game content of the plurality of game content displayed to the first authenticated user during game play. The central server prevents the first and second amusement devices from subsequently displaying the first game content to the first authenticated user until a remainder of the plurality of game content is displayed to the first user at the first amusement device or the second amusement device.

In yet another aspect, a preferred embodiment of the present invention is directed to a method of controlling first and second amusement devices that are in communication with each other through a central server. The first and second amusement devices store an electronic game having a plurality of game content including a first game content. The method comprises receiving log-in information from the first amusement device at the central server, comparing the log-in information to stored authorization information at the central server to identify a first authenticated user, transmitting, by the central server, the identity of the first authenticated user to the first amusement device, displaying, by the first amusement device, the first game content to the first authenticated user on a first display, receiving the first game content at the central server from the first amusement device and preventing, by the central server, the first and second amusement devices from displaying the first game content to the first authenticated user until a remainder of the plurality of game content has been displayed to the first authenticated user at one of the first and second amusement devices.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
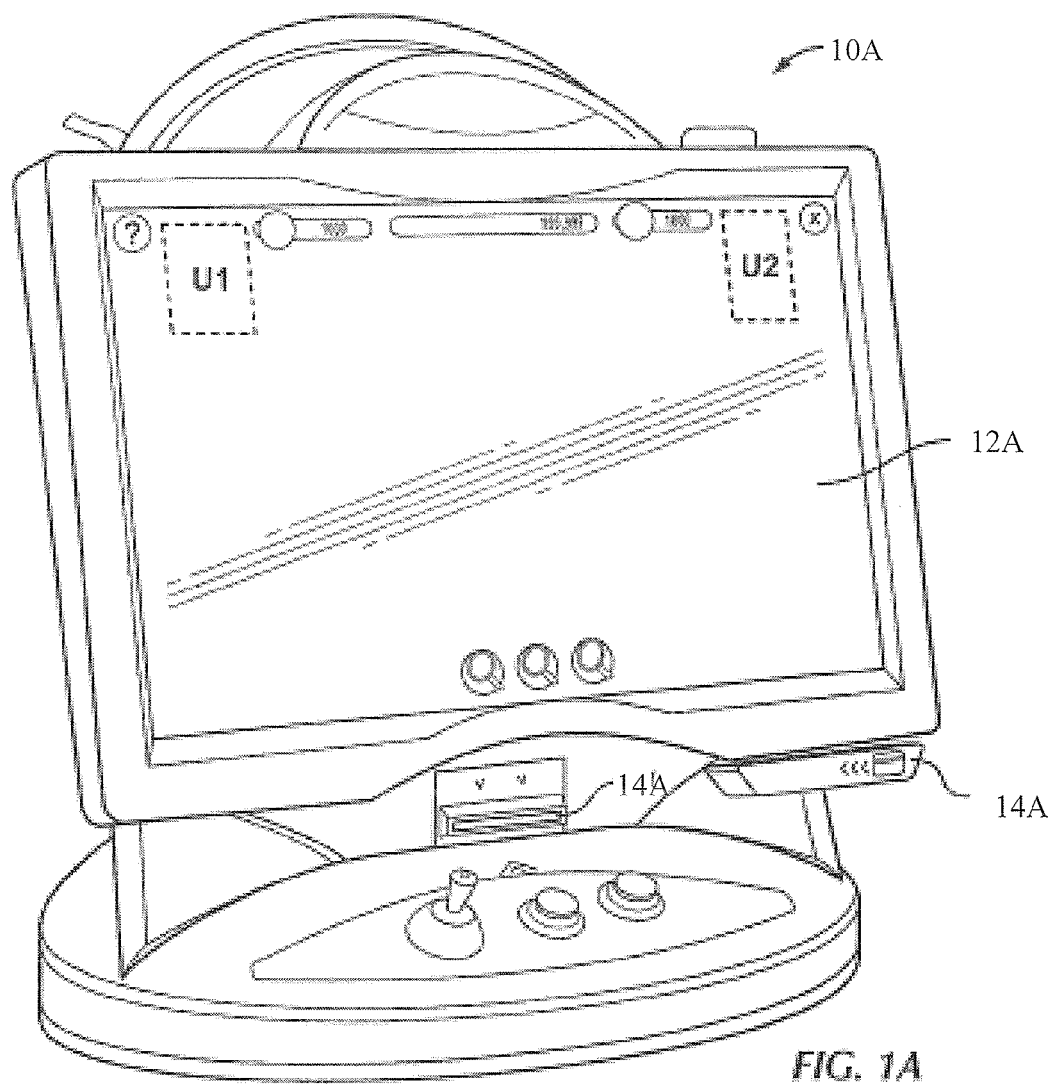
FIG. 1A is a front perspective view of an amusement device in accordance with a first preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Referring to the drawings in detail, wherein like reference numerals indicate like elements throughout, there is shown in FIG. 1A a first preferred embodiment of an amusement device 10A. The amusement device 10A includes a first controller U1 and a first memory U2. The first memory U2 can be any known or suitable memory device such as random access memory (RAM), read only memory (ROM), flash RAM, hard disk, optical disk, or the like. The first preferred amusement device 10A further includes a first video display 12A that is operatively connected to the first controller U1. The first preferred amusement device 10A is preferably a counter-top or table-top apparatus, but may be arranged in any configuration, such as free-standing, floor-standing, table mount, wall mount, pole mount, portable, wireless and the like without departing from the preferred invention.

The amusement device 10A of the first preferred embodiment preferably also includes at least one input component or a first input component 14A that receives value in order to establish one or more playable credits. The value received may be at least one of currency, coins, tokens, chits, credits, credit cards/debit cards or the like. Although two first input components 14A are shown, the amusement device 10A of the first preferred embodiment may include any number of input components 14A to give a user an option for payment, for permitting multiple players, or the like. Preferably, the amusement device 10A of the first preferred embodiment is made operable upon actuation of the first input component 14A, for example, the user may only select and play an electronic game once value is received at the first input component 14A and/or one or more playable credits are issued to the user. However, free selections may be offered at the discretion of an operator of the amusement device 10A.

Figure 1B:
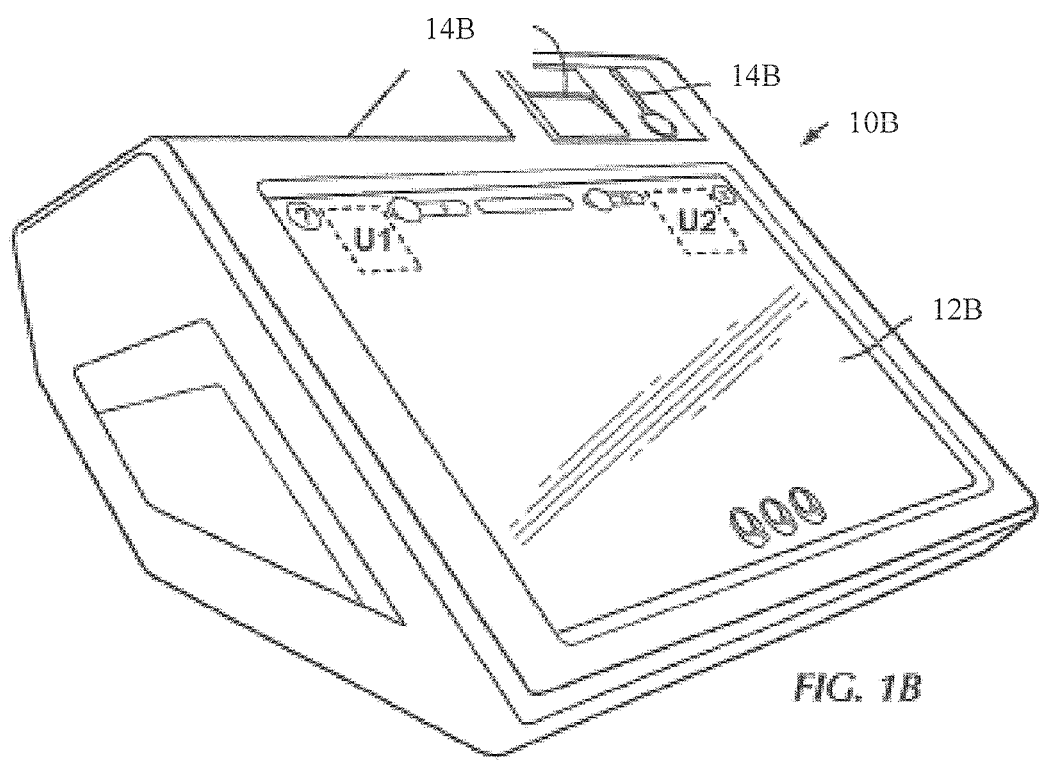
FIG. 1B is a front perspective view of an amusement device in accordance with a second preferred embodiment of the present invention.

Referring to FIG. 1B, in another or a second preferred embodiment, an amusement device 10B also includes a second controller U1, a second memory U2, a second display 12B, and at least one second input component 14B. The second controller U1, second memory U2, second display 12B and at least one second input component 14B are preferably similar to, but not necessarily the same as the first controller U1, first memory U2, first display 12A and first input components 14A of the amusement device 10A of the first preferred embodiment.

Figure 1C:
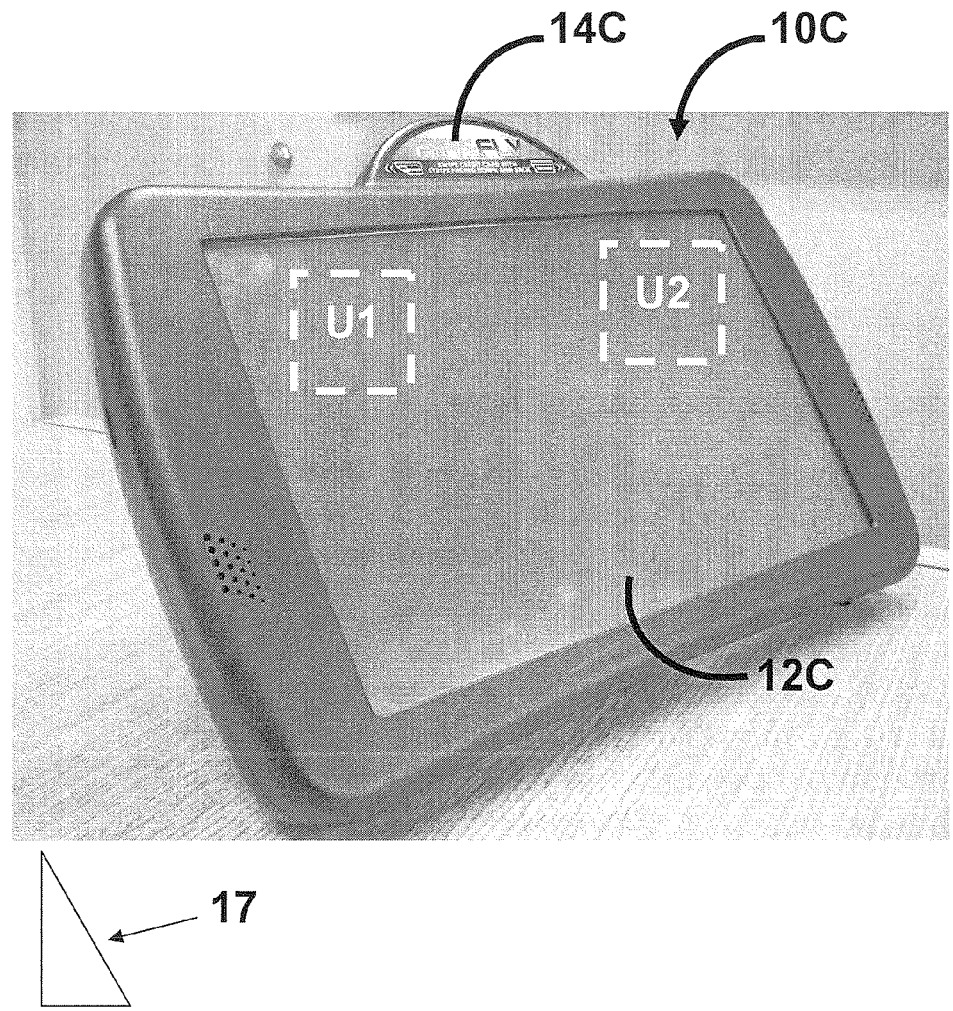
FIG. 1C is a front perspective view of an amusement device in accordance with a third preferred embodiment of the present invention.

Referring to FIG. 1C, in yet another or a third preferred embodiment, an amusement device 10C includes a third controller U1, a third memory U2, a third display 12C, and at least one third input component 14C. The third amusement device 10C is preferably comprised of a portable device and is preferably battery-powered. The third preferred amusement device 10C is not limited to being portable or battery-powered and may be comprised of a stand or table mounted, plug-in device. The third preferred amusement device 10C is preferably usable with a docking station 17. The docking station 17 preferably secures the amusement device 10C until accessed by an operator or paid for by a user and also preferably charges the battery of the third preferred amusement device 10C. Release from the docking station 17 may occur via an entry through the input component 14C, which is preferably a card reader, but is not so limited and may be comprised of nearly any variety of input component prompting release of the amusement device 10C from the docking station 17 and/or actuation of the amusement device 10C for use by an authenticated user. The docking station 17 may also provide battery recharging and other services to the amusement device 10C.

Preferably, the video displays 12A, 12B, 12C of the three preferred amusement devices 10A, 10B, 10C are touchscreen video displays 12A, 12B, 12C configured to accept touch input, but are not so limited and may be comprised of conventional displays 12A, 12B, 12C or nearly any variety of display for showing or displaying game content to the authenticated user.

Referring to FIGS. 1A-1C, for convenience, the amusement devices 10A, 10B, 10C of the first, second and third preferred embodiments will be referred to hereinafter simply as "amusement device 11," the displays 12A, 12B, 12C will be referred to hereinafter simply as "display 13," and the input components 14A, 14B, 14C will be referred to hereinafter simply as "input component 15." The controllers U1 and memories U2 of the preferred amusement devices 11 will generically be referred to herein as the controller U1 and the memory U2.

Turning now to the operation of the amusement device 11, the memory U2 stores one or more application programs, such as electronic games, a music or video jukebox program, or the like, and a system control program. However, the one or more application programs may also be stored remotely, such as on a remote service which is in communication with the amusement device 11 or a central server. Each electronic game stored in the memory U2 of the amusement device 11 generally includes a finite amount of game content. The game content includes, for example, the available game scenarios (i.e., a hand of cards, a puzzle board, and the like) or the available trivia questions. For example, for a puzzle game, there are a finite number (e.g., 1,000) of different puzzles which may be presented to a user upon selection of the puzzle game for play. Similarly, for a trivia game, there are a finite number of questions which may be presented to a user for answering upon selection of the trivia game. The memory U2 is preferably configured to store a plurality of games, each with multiple game content or game scenarios, such as trivia questions and puzzles.

The controller U1 preferably controls the touchscreen display 13 based upon a system control program retrieved from the memory U2 and based upon inputs from the touchscreen display 13. As used herein, the system control program refers to all of the software functions outside of the application program files including an operating system, device profile, display control, input control, sound drivers, and the like. Other input devices which may be connected to the amusement device 10 include a pushbutton(s), a trackball or touchpad, a mouse, a joy-stick, a foot-pedal, a voice recognition system, a keypad or keyboard, and the like. Preferably, however, the input device is a or is comprised partially of the touchscreen display 13.

The amusement device 11 preferably includes an operating mode and a setup mode. When the operating mode is selected, a player or user is selectively permitted to access the application programs. When the setup mode is selected, the owner/operator is permitted to make system setup adjustments. To switch from the operating mode to the setup mode, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 11. In the setup mode, the owner/operator may also make adjustments to the game features as will be described in greater detail hereinafter.

Figure 2:
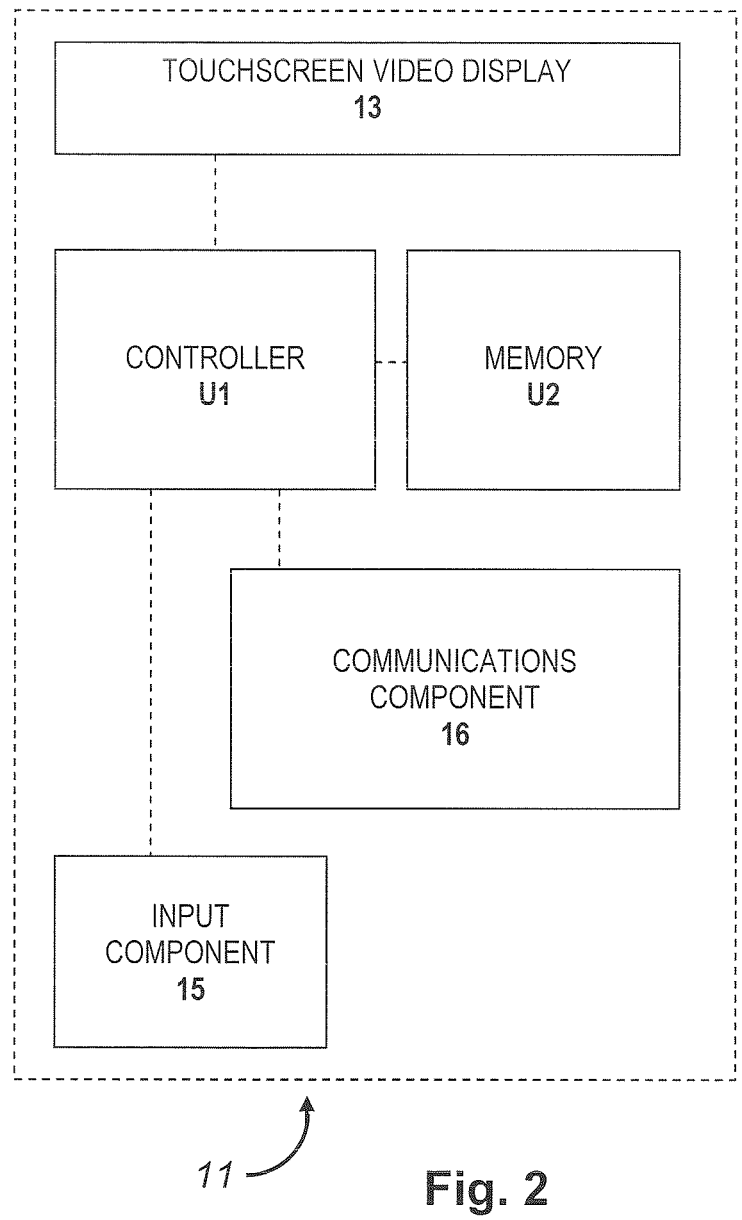
FIG. 2 is a schematic block diagram of an amusement device in accordance with a preferred embodiment of the present invention.

FIG. 2 is a schematic block diagram of the preferred amusement device 11 described above. The touchscreen display 13 is coupled to the controller U1 and the controller is coupled to the input component 15. The amusement device 11 also includes a communications component 16, such as an Ethernet port, a wireless transceiver, an infrared (IR) port, or the like. Using the communications component 16, the amusement device 11 may communicate with other devices or file servers, access the Internet, communicate over wide area networks (WANs) or local area networks (LANs), or the like.

Figure 3:
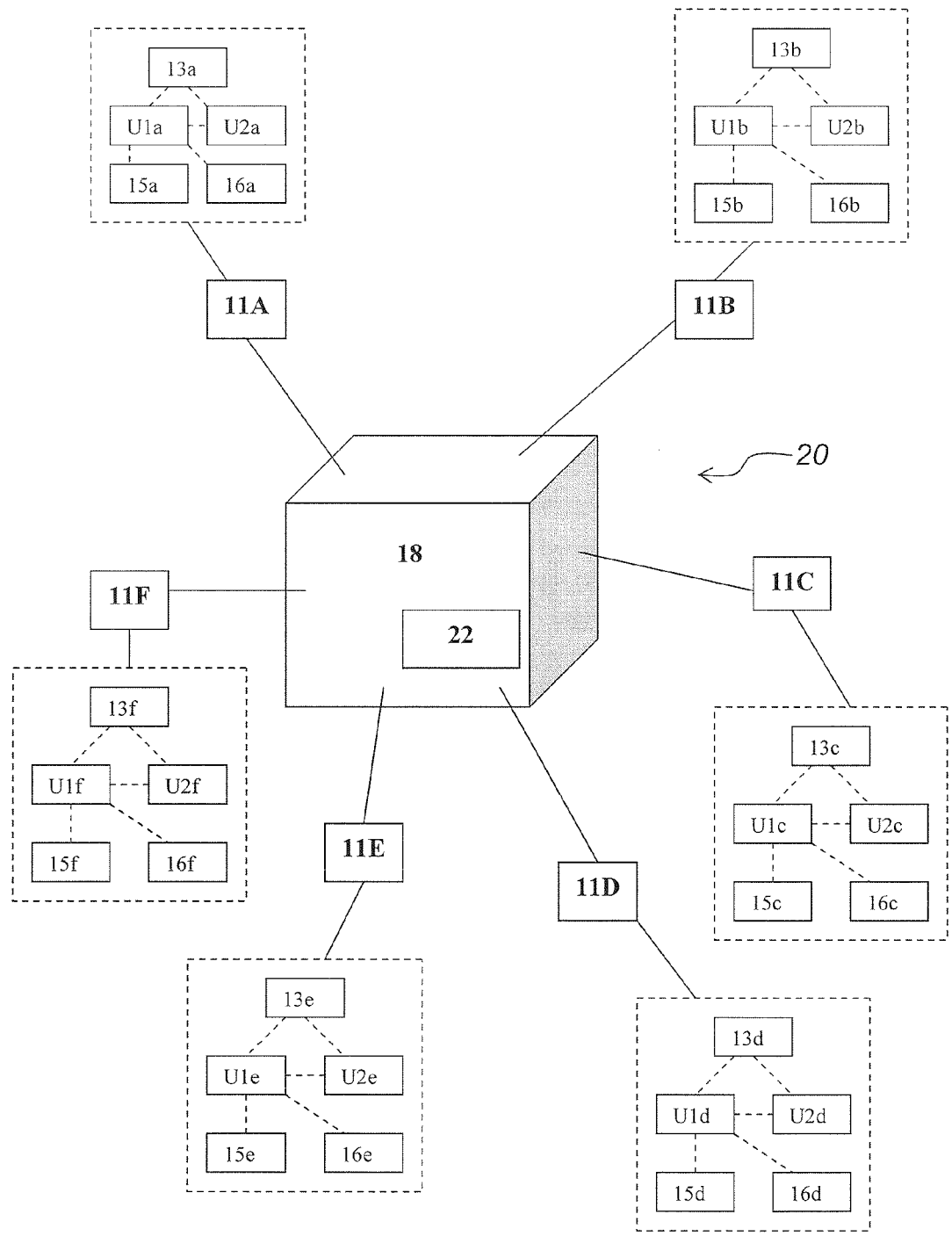
FIG. 3 is a schematic block diagram of an amusement device system in accordance with a preferred embodiment of the present invention.

Referring to FIGS. 2 and 3, for example, a first amusement device 11A may connect with a second amusement device 11B using the communications component 16. The second amusement device 11B optionally includes all of the same or similar components and features as the first amusement device 11A. Similarly, the first and second amusement devices 11A, 11B may connect with a remote central server 18 using the communications component 16, as shown in FIG. 3.

Preferably, as shown in FIG. 3, a plurality of amusement devices 11A, 11B, 11C, 11D, 11E, 11F are in communication with each other and/or with the central server 18 as part of an amusement device system 20. The central server 18 preferably manages each amusement device 11A, 11B, 11C, 11D, 11E, 11F, as well as each amusement device user account, which is preferably stored in the memories U2a, U2b, U2c, U2d, U2e, U2f and/or a central database 22 of the central server 18. The preferred embodiment of the amusement device system 20 shown in FIG. 3 includes the first amusement device 11A, the second amusement device 11B, a third amusement device 11C, a fourth amusement device 11D, a fifth amusement device 11E and a sixth amusement device 11F in communication with the central server 18. The amusement device system 20 is not limited to six amusement devices 11A, 11B, 11C, 11D, 11E, 11F connected to the central server 18 and may include nearly any number of amusement devices 11 associated with or in communication with the central server 18 such that the central server 18 is able to track use and game play by various authenticated users of the amusement devices 11A, 11B, 11C, 11D, 11E, 11F, as is discussed below.

The plurality of amusement devices 11A, 11B, 11C, 11D, 11E, 11F may be comprised of one or a combination of the amusement devices 10A, 10B, 10C of the first, second and third embodiments of FIGS. 1A-1C. However, the plurality of amusement devices 11A, 11B, 11C, 11D, 11E, 11F of the amusement device system 20 is not limited to one or a combination of the amusement devices 10A, 10B, 10C of the first, second and third embodiments and may be comprised of nearly any amusement device that is able to communicate with the central server 18, display content to the authenticated user and otherwise perform the functions of the preferred amusement device 11.

The first amusement device 11A preferably includes a first memory U2a, a first display 13a, a first input device 15a, a first communications component 16a and a first controller U1a that operate generally as described above with respect to the similar components of the first, second and third preferred embodiments of the amusement devices 10A, 10B, 10C. The first controller U1a is preferably, operably coupled to the first memory U2a, the first input device 15a and the first display 13a. The first memory U2a stores an electronic game having a plurality of game content, including a first game content that is preferably comprised of a subset of the plurality of game content. During game play, the first controller U1a controls the first display 13a based at least in part on inputs from the first input device 15a, which may be comprised of or associated with the first display 13a. Specifically, the first input component 15a may be comprised of or cooperate with the first display 13a, when the first display 13a is comprised of a first touchscreen display 13a. The first controller U1a preferably shows or displays the first game content of the plurality of game content to an authenticated user on the first display 13a.

Similar to the first amusement device 11A, the second, third, fourth, fifth and sixth amusement devices 11B, 11C, 11D, 11E, 11F of the preferred amusement device system 20 shown in FIG. 3 include second, third, fourth, fifth and sixth memories U2b, U2c, U2d, U2e, U2f, second, third, fourth, fifth and sixth displays 13b, 13c, 13d, 13e, 13f, second, third, fourth, fifth and sixth input devices 15b, 15c, 15d, 15e, 15f, second, third, fourth, fifth and sixth communication components, 16b, 16c, 16d, 16e, 16f and second, third, fourth, fifth and sixth controllers U1b, U1c, U1d, U1e, U1f that operate generally as described above with respect to the first, second and third preferred embodiments of the amusement devices 10A, 10B, 10C, respectively. The second, third, fourth, fifth and sixth memories U2b, U2c, U2d, U2e, U2f preferably store at least the same plurality of game content as is stored in the first memory U2a of the first amusement device 11A, but are not so limited and may store different game content or may receive the game content directly from the central server 18 or an alternative source. In the preferred embodiment, the first and second displays 13a, 13b are comprised of first and second touchscreen video displays 13a, 13b, respectively. These first and second touchscreen video displays 13a, 13b may be comprised of or a component of the input devices 15a, 15b of the first and second amusement devices 11A, 11B.

In the preferred embodiment of the amusement device system 20, one of the individual amusement devices 11A, 11B, 11C, 11D, 11E, 11F, such as the first amusement device 11A, allows a user to set up a user account to verify or establish the user as an authenticated user. The account may be associated solely with the user via the user's name. However, the account may also be associated with the user via address, phone number, credit card number, social security number, driver's license number, random user name, random user password, predetermined user pseudonym, predetermined user password or the like, including combinations. The user may also optionally protect the account through the use of an account name, username and/or a password of the user's choosing. The central server 18 preferably manages each of the authenticated or registered user accounts, including tracking and cataloguing the associated activity for each authenticated or registered account.

The authenticated user is preferably able to access his or her account at any time by inputting the required credentials (i.e., the account name, username and/or password) for that account on one of the amusement devices 11A, 11B, 11C, 11D, 11E, 11F. Preferably, as part of the request to connect to and/or access the central server 18, the central server 18 requires the authenticated or account user to provide log-in information to the central server 18. The log-in information is preferably compared to authenticated user information stored in the central server 18 or the individual amusement devices 11A, 11B, 11C, 11D, 11E, 11F so that the authenticated user is able to access their authenticated user account that stores information related to the particular authenticated user, including the authenticated user's game play history and the plurality of game content. The central server 18 is not limited to requiring the user to provide log-in information and the user may provide identification information that can be stored and retrieved by the central server 18 or the central server 18 may not require any information from the user prior to starting game play. In addition, methods of logging into a network are well known in the art, and any such method may be employed in this preferred system.

In one preferred embodiment of the present invention, the central server 18 may cause a webpage having a log-in screen to be presented on the display 13a, 13b, 13c, 13d, 13e, 13f of the amusement device 11A, 11B, 11C, 11D, 11E, 11F. Log-in information may include, for example, a username and password for an authenticated or registered account, as described above, or any other unique identifier associated with the user account, security questions and the like. Preferably, upon receiving the log-in information from the amusement device 11, the central server 18 identifies the requesting user by performing an authentication to determine whether the provided log-in information is valid. Validity of the log-in information may be determined by, for example, comparing the log-in information to stored authorization information stored in a database of the central server 18 for all registered accounts. However, it will be understood by those skilled in the art that any acceptable authentication or validation procedure/mechanism may be employed for the association of a user of one of the amusement devices 11A, 11B, 11C, 11D, 11E, 11F with a user account via the central server 18. In addition, the stored authorization information may be stored at the individual amusement devices 11A, 11B, 11C, 11D, 11E, 11F such that the specific individual amusement device 11A, 11B, 11C, 11D, 11E, 11F is not required to communicate with the central server 18 while verifying, identifying and/or authorizing a particular user through the log-in information.

Upon determining that the log-in information is valid, a connection between the individual amusement device 11A, 11B, 11C, 11D, 11E, 11F and the central server 18 is established and a valid log-in session commences. Accordingly, once the user's account credentials have been validated or authenticated, the central server 18 begins tracking and cataloguing the activity for that account during the log-in session while the authenticated user plays the selected game selected from the preferred plurality of games. More particularly, the activity associated with each registered or authenticated user account is preferably tracked, catalogued and stored by a central database 22, which is maintained by the central server 18. The account activity data, which is catalogued by the central database 22, preferably includes information sufficient to identify the amusement content viewed, accessed and/or played by the authenticated or account user during each log-in session. The account activity data also preferably includes such information as the date(s) of each log-in session, the type(s) of amusement content viewed, accessed and the like during each log-in session, the time or duration of each log-in session and the like. The account activity is preferably tracked, catalogued and stored by the central server 18 for each individual authenticated user. Specifically, the central server 18 is able to track, catalogue and store game play information for the individual authenticated user for game play on any of the individual amusement devices 11A, 11B, 11C, 11D, 11E, 11F associated with the amusement device system 20 at different times and while playing different games or being shown different content on the displays 13a, 13b, 13c, 13d, 13e, 13f.

In the context of the amusement gaming device 11 which stores one or more electronic games for selection and play, the information tracked and catalogued by the central database 22 includes information sufficient to identify each game selected for play and/or played by the authenticated user during a log-in session, each type of game selected for play and/or played by the particular authenticated user, the particular game content presented to the authenticated user, the particular game content played by the authenticated user, and the like. For example, for a puzzle game, the central database 22 will preferably catalogue all of the information necessary to identify each puzzle scenario which has been presented to and played by the authenticated user. The central database 22 also catalogues all of the information necessary to identify each puzzle scenario which has been presented to and played by all other authenticated users during the present and previous log-in sessions. For a trivia game, the information catalogued by the central database 22 includes the identifying information for each trivia question which has been presented to and/or answered by the authenticated user, either correctly or incorrectly.

In a preferred embodiment, the plurality of game content may include a first trivia question, a second trivia question, a third trivia question and a fourth trivia question. The first game content displayed to the authenticated user on the first display 13a may be the first trivia question and the central server would subsequently prevent display of the first trivia question to the particular authenticated user until the second, third and fourth trivia question are shown or displayed to the particular authenticated user. Displaying or showing new or fresh game content to the authenticated user prevents repeating the same content to the authenticated user and potential boredom of the authenticated user with the game. It is preferred that a trivia game would include significantly more that four trivia questions in its game content, but four questions are described as an illustrative example. The plurality of game content may also include multiple puzzle games, multiple photograph sets for a photograph comparison game, card games, sports games, games of skill, games of chance, action games and other related or like games.

In a preferred embodiment of the present invention, because the central server 18 catalogues all of the particular game content (e.g., game scenario, game question, and the like) which is displayed to the authenticated user and associates the information with the particular authenticated user's account during each log-in session, the system 20 can ensure that the authenticated user is presented with different game content at any one of the individual amusement devices 11A,

11B, 11C, 11D, 11E, 11F during subsequent log-in sessions. Preferably, the authenticated user is presented with different game content, which he or she has not previously seen or played, until the entire plurality of available game content has been exhausted—that is, until every available game scenario, question, puzzle and/or the like has already been presented to and played by the particular authenticated user. For example, the system 20 is preferably configured to show the first game content of the plurality of game content saved in the first memory U2a to the authenticated user during their first game play and to prevent showing or displaying the same first game content to the authenticated user on any of the amusement devices 11A, 11B, 11C, 11D, 11E, 11F of the system 20 to the same authenticated user until a remainder of the plurality of game content has been displayed to the authenticated user. Thus, the authenticated user is presented with new game content during each log-in session, regardless of whether the authenticated user logs into the same one of the amusement devices 11A, 11B, 11C, 11D, 11E, 11F.

This preferred randomization of the game content displayed or shown to the authenticated user can be implemented, for example, by the use of a random or pseudorandom number generator with a defined seed value. Each time the controller U1 presents game content for play to the particular authenticated user, the central database 22 and/or central server 18 keeps track of the particular game content displayed to the authenticated user and the random seed used to generate the associated random number. Thus, for each authenticated user or player, the central database 22 keeps track of the random seed used to randomize the list of available game content, the particular game content displayed to the authenticated user, and where in the listing of available game content the displayed content falls. Thus, the next time the user/player logs into the preferred amusement device system 20, the system 20 can essentially start with the next available game content in the listing for displaying to the authenticated user. This preferred technique ensures that the authenticated user is presented with different game content during every log-in session. However, it will be understood by those skilled in the art that any conventional method or system for random or pseudorandom number generation may be utilized, as long as it is ensured that the authenticated user is generally presented with a different and new game content during every log-in session.

Figure 4:
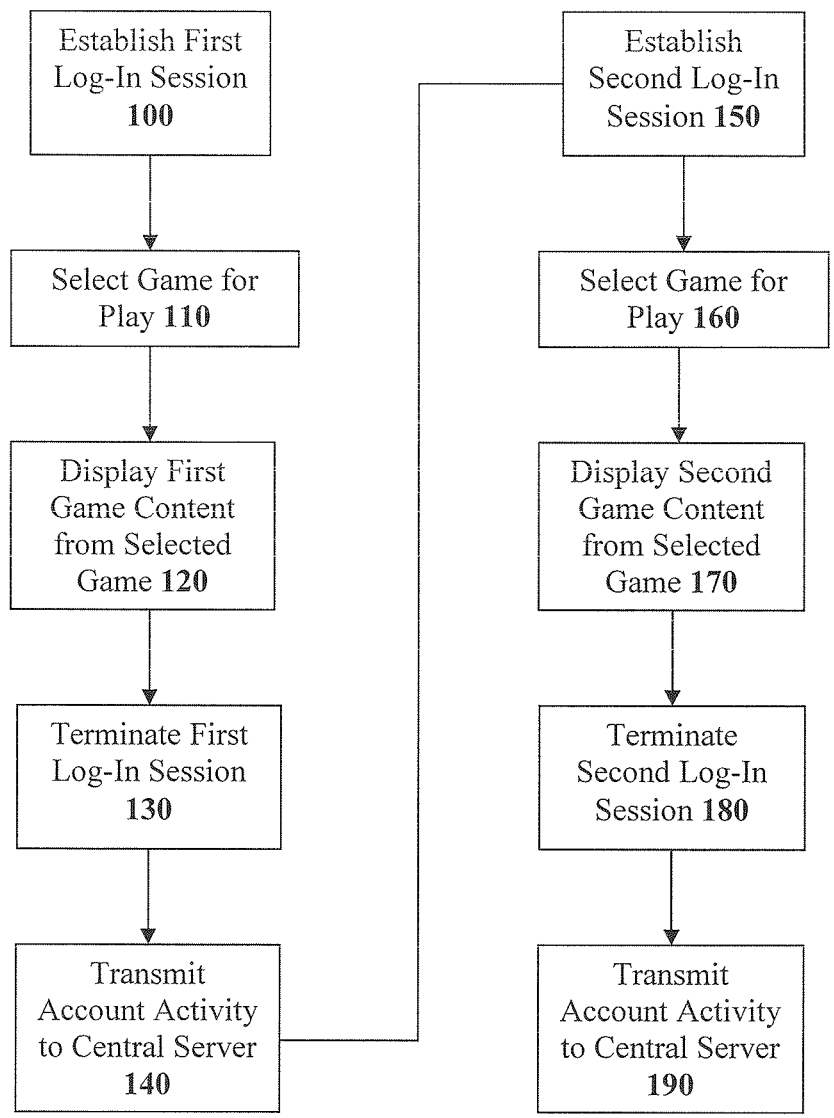
FIG. 4 is a schematic flow diagram illustrating steps for playing an electronic game in accordance with another embodiment of the present invention.

Referring to FIG. 4, there is shown a schematic implementation of the amusement device system 20 and method for selecting and playing a game on one of the individual amusement devices 11A, 11B, 11C, 11D, 11E, 11F. At a first step 100, the user logs into his or her account on the individual amusement device 11A, 11B, 11C, 11D, 11E, 11F and is verified as one of the authenticated users. The authenticated user is then prompted at step 110 to select an electronic game from a plurality of electronic games available for selection and play on that individual amusement device 11A, 11B, 11C, 11D, 11E, 11F. Once a selection is made, the individual amusement device 11A, 11B, 11C, 11D, 11E, 11F, and more particularly the controller U1 of the individual amusement device 11A, 11B, 11C, 11D, 11E, 11F, then causes a first game content of the selected game to be presented or displayed on the display 13 of the individual amusement device 11A, 11B, 11C, 11D, 11E, 11F at step 120.

Generally upon or immediately after the user terminates his or her log-in session on the individual amusement device 11A, 11B, 11C, 11D, 11E, 11F (e.g., at step 130), the controller U1 of the individual amusement device 11A, 11B, 11C, 11D, 11E, 11F transmits all of the account activity information for that particular log-in session to the central database 22 at the central server 18 (e.g., at step 140). Specifically, after the account session has ended, the central server 18 receives the identifying information for the game content (e.g., game scenario or questions) presented to and/or played by the account user from the controller U1, and the identifying information is stored in the central database 22. In another embodiment, the controller U1 transmits such information to the central server 18 generally, continuously during the log-in session or after the completion of play of each game content or play of portions of game content. During a second or any subsequent log-in session for the same account or the same authenticated user, either at the same or a different one of the individual amusement devices 11A, 11B, 11C, 11D, 11E, 11F, shown as step 150, when the user selects the same game for play at step 160, the central server 18 prompts the controller U1 to display a second and different game content of the selected game to the authenticated user for playing (e.g., step 170). Again, upon termination of the second log-in session or periodically during the log-in session (e.g., at step 180), the identifying information of the game content viewed and/or played by the authenticated user during the second log-in session is transmitted to and stored at the central database 22 at step 190. During each subsequent log-in session where the authenticated user selects the same game for play, the controller U1 presents a different and new game content from the plurality of available game content for the selected game to the account user, until all of the available game content is exhausted.

In one embodiment, upon the point of exhaustion of the available game content, the controller U1 begins presenting the authenticated user with game content which the authenticated user has previously seen and/or played. In another embodiment, upon the point of exhaustion of available game content for a particular game, the central server 18 downloads additional game content from a remote source and transmits the new game content to the individual amusement device 11A, 11B, 11C, 11D, 11E, 11F. In another embodiment, the controller U1 directly downloads additional game content from the remote source. Alternatively, new game content may be generally periodically downloaded at any time when the individual amusement device 11A, 11B, 11C, 11D, 11E, 11F is in the operating mode or the individual amusement devices 11A, 11B, 11C, 11D, 11E, 11F may share new or different game content directly between each other.

The amusement devices 11A, 11B, 11C, 11D, 11E, 11F may also include other functionality and features such as music jukebox, video jukebox, multimedia player, Internet browsing, broadcast media viewing, time based rental mode, non-prize tournaments, prize-based tournaments, head-to-head competitions, prize-based lotteries, ticket dispensing, prize dispensing, debit/credit card charging, phone card dispensing, e-mail, photography, placing customer orders, communicating with other amusement devices, and the like.

The central server 18 is preferably comprised of an internet-based central server 18 that is in communication with the amusement devices 11A, 11B, 11C, 11D, 11E, 11F through the Internet. The central server 18 is configured to store information sufficient to identify the first game content shown or displayed to the authenticated user, receive the first game content from the amusement devices 11A, 11B, 11C, 11D, 11E, 11F, store the first game content, track the first game content and prevent the amusement devices 11A, 11B, 11C, 11D, 11E, 11F from subsequently displaying or showing the first game content to the same authenticated user until the authenticated user has been shown a remainder of the plurality of game content on any of the amusement devices 11A, 11B, 11C, 11D, 11E, 11F.

The amusement device 11 may also provide for remote or local access for accounting and/or bookkeeping purposes. The amusement device 11 may include a local connector for uploading to a hand-held or portable computer or removable memory for receiving accounting or other data. The amusement device 11 may include accounting and bookkeeping screens accessible by an operator through set up screens and/or through password protection.

In operation of the preferred amusement device system 20, the first amusement device 11A may be operated by a first authenticated user and the second amusement device 11B may be operated by a second authenticated user. The first and second authenticated users may operate the amusement devices 11A, 11B at the same time, otherwise in parallel or at different times. The first amusement device 11A may show the first authenticated user the first content and the second amusement device 11B may show the second authenticated user second content of the plurality of game content. The central server 18 is able to store information sufficient to identify the first and second game content shown to the first and second authenticated users, respectively. Preferably, the central server 18 stores the first game content in the first authenticated user's user account and the second game content in the second authenticated user's user account. The controllers U1a, U1b, U1c, U1d, U1e, U1f subsequently prevent the central server 18 and/or the individual amusement devices 11A, 11B, 11C, 11D, 11E, 11F from again showing the first game content to the first authenticated user and the second game content to the second authenticated user until a remainder of the plurality of game content has been displayed to the first and second authenticated users, respectively. That is, the second authenticated user may view or receive the first game content, as long as the first game content does not overlap with the second game content, and the first authenticated user may view or receive the second game content, as long as the second game content does not overlap with the first game content, during subsequent game play, at least until the entire plurality of game content has been displayed to the individual authenticated user. Accordingly, the central server 18 is preferably able to track a plurality of authenticated users and their individual game play over time to prevent repeating game content until all of the game content for a particular game has been displayed to the particular individual authenticated user.

The first amusement device 11A includes the first communications component 16a that preferably permits communication between the first amusement device 11A and the central server 18. In addition, the second amusement device 11B includes the second communication component 16b that permits communication between the second amusement device 11B and the central server 18. The first and second amusement devices 11A, 11B may also be in communication with each other through the first and second communication components 16a, 16b. The first, second, third, fourth, fifth and sixth communications components 16a, 16b, 16c, 16d, 16e, 16f are preferably comprised of an Ethernet port, a wireless transceiver, an infrared port or a related, like communication component that facilitates communication between the amusement devices 11A, 11B, 11C, 11D, 11E, 11F themselves, the central server 18 or other like components or systems.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention.

I claim:

1. An amusement device system comprising:
a first amusement device having a first memory, a first display and a first controller, the first controller being operatively coupled to the first memory, a first input device and the first display, the first memory storing an electronic game having a plurality of game content, the first controller controlling the first display based at least in part on inputs from the first input device and being configured to show a first game content of the plurality of game content to an authenticated user on the first display;
a second amusement device having a second memory, a second display and a second controller, the second controller being operatively coupled to the second memory, a second input device and the second display, the second memory storing the electronic game having the plurality of game content; and
an internet-based central server in communication with the first and second amusement devices through the internet, the central server configured to store information sufficient to identify the first game content displayed to the authenticated user, the first and second controllers being prevented by the central server from again showing the first game content to the authenticated user on the first and second displays until a remainder of the plurality of game content has been displayed to the authenticated user.

2. The amusement device system of claim 1, wherein the central server stores an authenticated user account, the central server being configured to accept log-in information from the authenticated user for the authenticated user to access the authenticated user account, the authenticated user account storing information related to the plurality of game content including the first game content.

3. The amusement device system of claim 1, wherein the first and second displays are comprised of first and second touchscreen video displays, respectively.

4. The amusement device system of claim 1, wherein the first and second input devices are comprised of first and second touchscreen video displays, respectively.

5. The amusement device system of claim 1, wherein the plurality of game content includes a first trivia question, a second trivia question, a third trivia question and a fourth trivia question, the first game content comprised of the first trivia question.

6. The amusement device system of claim 1, wherein the plurality of game content includes a first puzzle, a second puzzle, a third puzzle and a fourth puzzle, the first game content comprised of the first puzzle.

7. The amusement device system of claim 1, wherein the plurality of game content includes a plurality of photograph sets for a photograph comparison game, the plurality of game content including a first set of photographs, a second set of photographs, a third set of photographs and a fourth set of photographs, the first game content comprised of the first and second set of photographs.

8. The amusement device system of claim 1, wherein the plurality of game content includes card games, sports games, games of skill, games of chance, action games, trivia games, puzzle games and photograph comparison games.

9. The amusement device system of claim 1, wherein the authenticated user is a first authenticated user, the first controller further configured to show a second game content of the plurality of game content to a second authenticated user on the first display, the central server configured to store information sufficient to identify the second game content displayed to the second authenticated user, the first and second controllers being prevented by the central server from again showing the second game content to the second authenticated user on the first and second displays until a remainder of the plurality of game content has been displayed to the second authenticated user.

10. The amusement device system of claim 1, wherein the central server is configured to direct the first amusement device to show the first game content to the authenticated user based on a random number generator with a defined seed value, the central server being in communication with the first and second amusement devices and further configured to keep track of the seed value and an associated random number generated by the random number generator.

11. An amusement device system for tracking game content displayed to a first authenticated user, the amusement device system comprising:
 a first amusement device including a first touchscreen video display and a first memory, the first memory storing a plurality of game content;
 a second amusement device including a second touchscreen video display and a second memory, the second memory storing the plurality of game content; and
 a central server in communication with the first and second amusement devices, the central server configured to receive first game content from the first amusement device defining game content of the plurality of game content displayed to the first authenticated user during game play, the central server preventing the first and second amusement devices from subsequently displaying the first game content to the first authenticated user until a remainder of the plurality of game content is displayed to the first user at one of the first and second amusement devices.

12. The amusement device system of claim 11 further comprising:
 a plurality of additional amusement devices in communication with the central server, the central server preventing the first, second and plurality of additional amusement devices from subsequently displaying the first game content to the first authenticated user until a remainder of the plurality of game content is displayed to the first user at one of the first, second and additional amusement devices.

13. The amusement device system of claim 11, wherein the first amusement device includes a first communications component, the first amusement device in communication with the central server through the first communications component.

14. The amusement device system of claim 13, wherein the second amusement device includes a second communications component, the second amusement device in communication with the central server and the first amusement device through the second communications component.

15. The amusement device system of claim 13, wherein the first communications component is selected from the group consisting of an Ethernet port, a wireless transceiver and an infrared port.

16. The amusement device system of claim 11, wherein the central server manages user accounts including a first user account of the first authenticated user, the central server configured to track, catalogue and associate the first game content with the first user account.

17. The amusement device system of claim 16, wherein the central server is further configured to store first log-in information associated with the first user account.

\* \* \* \* \*